United States Patent [19]

Powell, Jr.

[11] Patent Number: 4,957,619

[45] Date of Patent: Sep. 18, 1990

[54] SELF-SINGULATING WEIGHT SIZER

[75] Inventor: Harry C. Powell, Jr., Faber, Va.

[73] Assignee: Powell Machinery, Inc., Faber, Va.

[21] Appl. No.: 248,199

[22] Filed: Sep. 23, 1988

[51] Int. Cl.⁵ .............................. B07C 5/02; B07C 5/16
[52] U.S. Cl. .................................... 209/539; 198/443;
    209/592; 209/698; 209/912; 209/934
[58] Field of Search .................................. 209/592-595,
    209/539, 698, 707, 922, 914, 912, 917, 552, 934,
    512-514, 646, 648; 198/635, 370, 443, 580, 504,
    505; 177/145, 262

[56]        References Cited
       U.S. PATENT DOCUMENTS

| 2,186,196 | 1/1940 | Haugh ............................... 209/912 X |
| 3,232,411 | 2/1966 | Kulig ................................ 198/580 X |
| 3,278,025 | 10/1966 | Willsey et al. ..................... 209/912 X |
| 3,628,653 | 12/1971 | Warkentin .......................... 198/436 |
| 3,948,765 | 4/1976 | Anschutz ............................ 209/513 |
| 4,106,628 | 8/1987 | Warkentin et al. ................. 209/556 |
| 4,254,877 | 3/1981 | Rose .................................. 209/912 X |
| 4,262,807 | 4/1981 | Leverett ............................. 209/592 |
| 4,273,649 | 6/1981 | Leverett ............................. 209/912 X |
| 4,426,006 | 1/1984 | Horii et al. ........................ 209/593 |
| 4,482,061 | 11/1984 | Leverett ............................. 209/592 |
| 4,489,822 | 12/1984 | Hiebert .............................. 198/478 |
| 4,585,126 | 4/1986 | Paddock et al. .................... 209/912 X |
| 4,586,613 | 5/1986 | Horii .................................. 209/556 |
| 4,595,091 | 6/1986 | Scopatz et al. .................... 198/372 |
| 4,645,404 | 2/1987 | Juravic .............................. 198/635 X |
| 4,660,665 | 4/1987 | Powell, Jr. ......................... 177/145 |
| 4,687,107 | 8/1987 | Brown et al. ...................... 209/556 |
| 4,6325,785 | 1/1987 | Prydtz ............................... 209/912 X |

OTHER PUBLICATIONS

"Decco Division, Pennwalt", newspaper advertisement for Univeyor sorting system machine, no date.

Primary Examiner—Donald T. Hajec
Attorney, Agent, or Firm—Nixon & Vanderhye

[57]         ABSTRACT

A sorter sorts discrete bruisable articles, such as pieces of fruit like applies, with minimum bruising. A continuous conveyor chain has a number of discrete article supporting elements connected to it for linear movement with it, and for pivotal movement about an axis parallel to the chain. At various stations along the chain a self-singulating section is provided in which the articles are singulated onto the supporting elements, a weighing section (or like property determining section) is provided after the self-singulating section, and a discharge section is provided at which the articles are discharged depending upon the weight sensed in the weighing section. The same chain supporting elements may continue through a second self-singulating section, a second weighing section, and a second discharge section. The supporting elements comprise plastic cups defining a shallow depresssion on a top face, e.g. a conically shaped depression with sidewalls making an angle of about 20°-30° with respect to the horizontal. The discharge section comprises a rail and a stationary cam having an upwardly angled cam surface located above the rail, and vertically spaced from the rail a distance slightly greater than the thickness of a pin extending from the cup. An electromagnet, or related mechanism, selectively deflects the pin so as to engage the angled cam surface to thereby ride up the cam surface and discharge the article carried by the cup.

22 Claims, 4 Drawing Sheets

FIG. 11
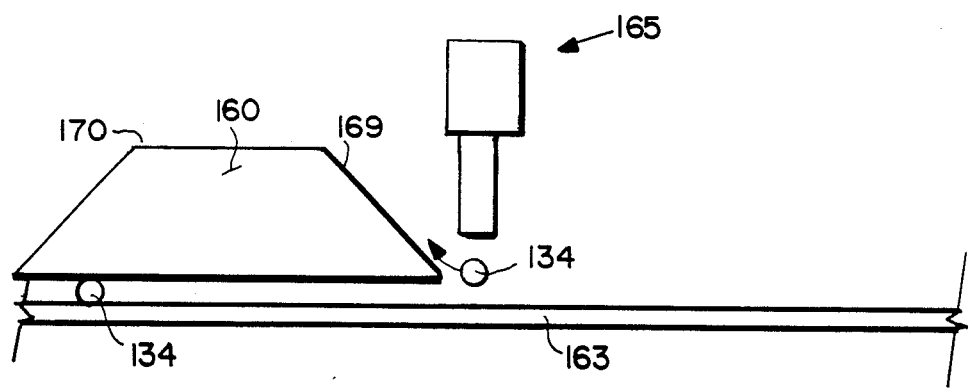
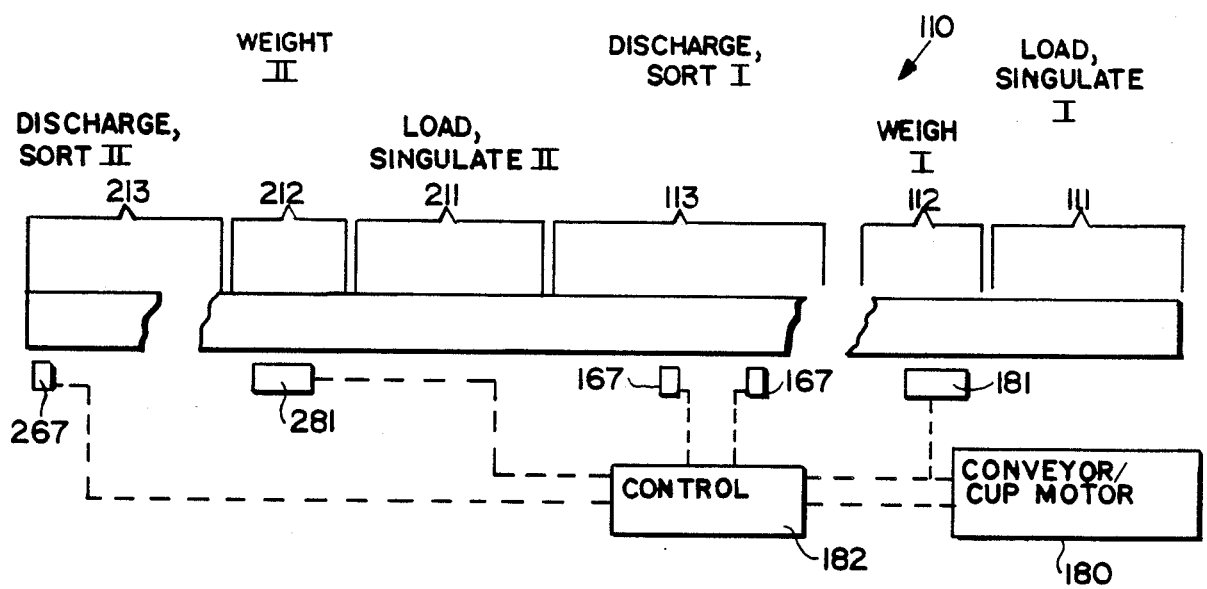
FIG. 13

SELF-SINGULATING WEIGHT SIZER

BACKGROUND AND SUMMARY OF THE INVENTION

In the design of equipment for sorting discrete bruisable articles, particularly for sorting pieces of fruit (e.g. apples or pears) by weight, color, or other property, additional care is being taken to handle the fruit gently so as to reduce bruising. While prior art sorters, such as disclosed in U.S. Pats. Nos. 4,595,091 and 4,262,807 do not necessarily handle the fruit roughly, there is a perception in the trade that the fruit should be handled more gently and therefore manufacturers of fruit sorting equipment are attempting to respond to this perception.

The two major areas where bruising can occur in conventional article sorting equipment are in the transfer of the pieces of fruit from a singulating mechanism to the conveyance cups (which then subsequently pass over a load cell or the like), and in the discharge of the pieces of fruit at a discharge section. Often the discharge is handled so that the piece of fruit is discharged in the direction of conveyance so that it has a large velocity component in that direction. It is more desirable so as to minimize bruising to discharge the article without a significant velocity component in the direction of conveyance by moving it generally perpendicular to the direction of conveyance. While there have been a number of procedures for effecting this in the past, such as shown in U.S. Pats. No. 4,595,091 and 4,586,613, oftentimes a larger discharge force than desirable has been imparted to the article either due to impacting of the article with a sidewardly moving element, or because the angle of tilt necessary to discharge the article was relatively large (e.g. more than about 30°).

According to the present invention, an article sorting apparatus and method are provided which seek to minimize the bruising of fruit during sorting thereof according to fruit property (particularly weight, but also possibly color, or other property thereof) while providing a simple and economical arrangement.

The apparatus according to the invention includes a continuous conveying chain elongated in a dimension of elongation with a plurality of discrete article supporting elements (cups) connected to the chain for linear movement with it, and for pivotal movement with respect to the chain about an axis generally parallel to the dimension of elongation. A plurality of stations are provided for the continuous conveying chain and article supporting elements, including a self-singulating section in which the articles are singulated onto the supporting elements, an article property determining section through which the articles are carried by the supporting elements and properties thereof sensed, and a discharge section in which the articles are selectively discharged at a plurality of spaced distinct locations depending upon the properties thereof sensed in the article property determining section. The self-singulating section may comprise a feed conveyor disposed at an angle with respect to the dimension of elongation and on one side of the article supporting elements, and a cushioning backstop disposed on the opposite side of the supporting elements from the feed conveyor. An overflow region before the article property determining section allows articles not singulated onto the supporting elements to move off of the supporting elements and the chain to be ultimately returned to the feed conveyor. The article property determining section preferably comprises a weighing station, having a load cell, and the elements are mounted to the chain with lost motion in the vertical direction so that they may be accurately weighed while continuously conveyed over the load cell.

The supporting elements preferably comprise plastic cups, each having a shallow depression on a top face. The depression is deep enough to positively hold the article for property determination and conveyance, but shallow enough so that the cup need be tilted only a small amount about its axis to effect discharge with minimal bruising; e.g. a generally conically shaped depression may be provided with the sidewalls thereof making an angle of between about 20°-30° with respect to the horizontal. Each cup includes a pin having a predetermined thickness extending outwardly from it generally perpendicular to the dimension of elongation.

The discharge section comprises a rail and a stationary cam having an upwardly angled cam surface located above the rail. The angled cam surface is vertically spaced from the rail a distance slightly greater than the thickness of the pin so as to allow passage of the pin beneath it if not deflected to the cam surface. An electromagnet or other means are provided for selectively deflecting the pin so as to engage the angled cam surface when deflected and thereby ride up the cam surface providing for discharge of the article.

The article sorter can also include a second self-singulating section, a second article property determining section, and a second discharge section following the first such sections, with the same chain and supporting elements extending therethrough. It is not believed that such an arrangement has been provided in a weight sizer before.

Apparatus according to the present invention also may comprise: A continuous conveying chain elongated in a dimension of elongation. A plurality of discrete article supporting elements connected to the chain for linear movement therewith, and including means for mounting the elements for pivotal movement with respect to the chain about an axis generally parallel to the dimension of elongation, each of the supporting elements comprising a plastic cup having means defining a shallow depression on a top face thereof, the depression being deep enough to positively hold an article for property determination and conveyance, but shallow enough so that the cup need be tilted only a small amount about the axis to effect discharge of the article. And, means for selectively effecting tilting of the cups so as to effect discharge of the articles therefrom. The cups are also mounted for lost motion in the vertical for accurate weighing, the same structure mounting the cups for pivotal movement and lost motion in the vertical.

The invention further contemplates a method of handling bruisable articles to minimize the bruising action of handling. The method comprises the steps of: (a) While continuously conveying the bruisable articles in a direction of conveyance, sequentially (a1) singulating, (a2) weighing, and (a3) selectively discharging the articles depending upon the weights thereof, utilizing a continuous mechanism so that there is no necessity for transferring the articles from one conveyance mechanism to another. And, (b) practicing said step (a3) by discharging the articles so that there is a minimal velocity component in the direction of conveyance when the article is discharged.

It is the primary object of the present invention to provide for the simple and effective sorting of discrete bruisable articles with a minimum of bruising. This and other objects of the invention will become clear from an inspection of the detailed description of the invention, and from the appended claims.

BRIEF DESCRIPTION OF THE DRAWINGS

FIG. 11 is a side view of an alternative embodiment of deflecting means from that illustrated in FIGS. 9 and 10;

FIG. 13 is a schematic view of a second embodiment of apparatus according to the invention.

DETAILED DESCRIPTION OF THE DRAWINGS

Figure 12:
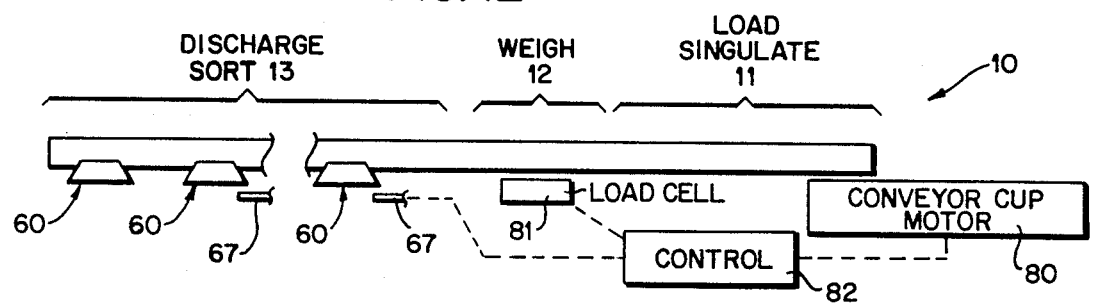
FIG. 12 is a schematic view of exemplary apparatus according to the invention.

With reference to FIG. 12, the basic sections of an article sorter for sorting discrete bruisable articles, such as pieces of fruit (apples, pears, etc.) is schematically illustrated by reference numeral 10. The apparatus includes a loading, self-singulating section 11, a weighing or other article property determining section 12, and a discharge, sorting section 13. The basic elements that extend throughout the sections 11 through 13 comprise a plurality of discrete article supporting elements (e.g. cups) 15 movable in a linear dimension 16, and connected to a chain 17 (e.g. see FIGS. 2 and 4) for movement in the direction 16, the chain 17 elongated in the dimension 16. The chain 17 is connected up to conventional sprockets, motors, and the like for continuously moving the chain, the details of which are standard and not per se a part of this invention.

Figure 1:
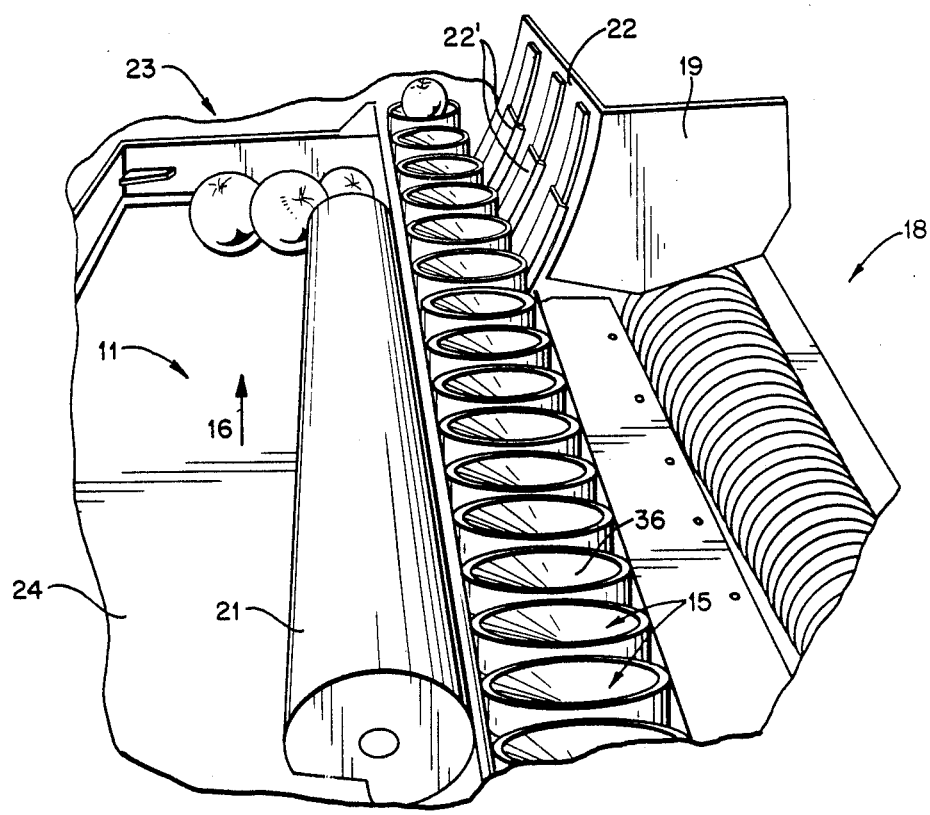
FIG. 1 is a perspective view of an exemplary self-singulating section of an article sorter according to the present invention.

In order to prevent the bruising that can occur when the pieces of fruit are transferred from a singulating section to a weighing section, a self-singulating action is provided. An exemplary self-singulating section is illustrated in detail in FIG. 1. In this particular self-singulating action, a feed conveyor 18, which may include rollers and a brush rotatable about axes parallel to the dimension 16, convey the pieces of fruit toward the cups 15, the fruit being guided on the sides thereof by sidewalls (one sidewall 19 being seen in FIG. 1). Located on the opposite side of the cups 15 from the feed conveyor 18 is a cushioning backstop 21, which may be—as illustrated in FIG. 1—merely a stationary roll of rubber, foam, or like cushioning material. Any articles tending to roll past the cups 15 will impact the backstop 21 and be gently pushed back onto the cups 15. At the end of the self-singulating section 11, and before the cups 15 transport the articles into the weighing section 12, an overflow discharge 23 is provided. A wall 22 prevents articles that have not been singulated into a cup 15 from moving off the cups 15 in that direction (the wall 22 having projections 22' thereon which tend to move the fruit not singulated onto cups 15 to the overflow section 23). At the overflow section 23 the pieces of fruit move onto a surface 24, which preferably is a conveyor which transports the overflow fruit in a dimension opposite the dimension 16, so that it is ultimately recycled to the feed section 18 utilizing any conventional return conveyors or the like.

Utilizing the apparatus 10, the self-singulating action is not dependent upon a side feed of fruit, but rather the fruit also may be fed onto the cups 15 from the end thereof, that is already moving in the dimension 16. End feeding mechanisms per se are known, typically including funnels or funnel-shaped walls which cause the fruit to move—under the influence of gravity, or conveyed by a conveyor—into a generally single file arrangement to be deposited on the cups 15.

The cups 15 and the chain 17 extend continuously throughout the self-singulating, weighing, and discharging sections 11 through 13. Where the section 12 is in fact a weighing section including a load cell (it may be another article property determining section in place of or in addition to a weighing section, such as an article color sensing section), the cups 15 are mounted to the chain 17 with a lost motion in the vertical dimension so that the articles may be accurately weighed while continuously conveyed, and additionally the cups are mounted for pivotal movement with respect to the chain 17 so that discharge can be effected in the discharge section 13. One form of an exemplary cup and interconnection of the cup to the chain is illustrated in FIGS. 2 through 5.

Figure 2:
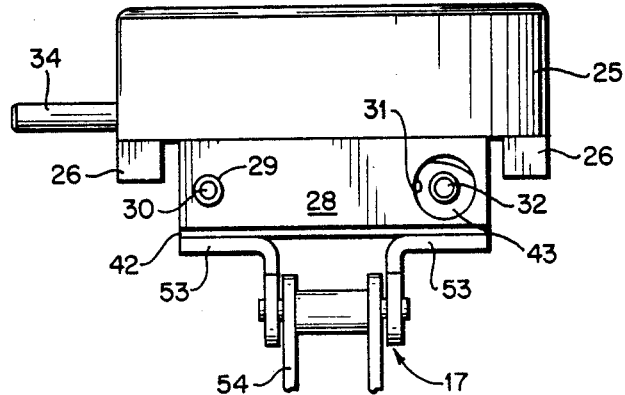
FIG. 2 is an end view of an exemplary discrete article supporting element (cup) mounted on a chain, utilizable in the apparatus according to the invention.

In the embodiment of FIGS. 2 through 5, the article supporting elements 15 comprise a cup body 25 which may be injection molded of plastic, but in the actual embodiment illustrated in FIG. 2 is machined from a solid block of plastic, such as ultra high molecular weight polyethylene. The body 25 includes bosses 26 extending downwardly from the sides thereof. The bosses 26 are adapted to engage rails in the weighing section so as to properly effect weighing. Neither the bosses 26 nor the weighing section are described in detail herein since they are conventional, such as illustrated in U.S. Pats. No. 4,660,665, 4,413,690, or 4,262,807, the disclosures of which are hereby incorporated by reference herein.

Also machined from the same block of plastic and integral with the cup body 25 and extending downwardly therefrom are the walls 28. These walls 28 extend generally perpendicular to the dimension 16 when the element 15 is in use. The walls 28 include means defining a first relatively small generally circular opening 29 (see FIG. 2) at one side thereof, for receipt of a pivot pin 30, and means defining a second, much larger, generally circular opening 31 in the other side thereof, which receives the pin 32 with a lost motion connection to allow accurate weighing of the articles transported by the element 15 in the weighing section 12. Note that the pin 32, opening 31, and related structures comprise means for simultaneously mounting said elements 15 for pivotal movement with respect to said chain 17 about the axis defined by pin 32 generally parallel to said dimension of elongation 16, and for mounting said elements 15 for lost motion in the vertical dimension so that said elements may pass over weighing means in section 12 (e.g. load cell 81) and distinctly separate each said element with supported article from the other components of the sorter 10 so that the supported article may be accurately weighed by the weighing means.

Figure 3:
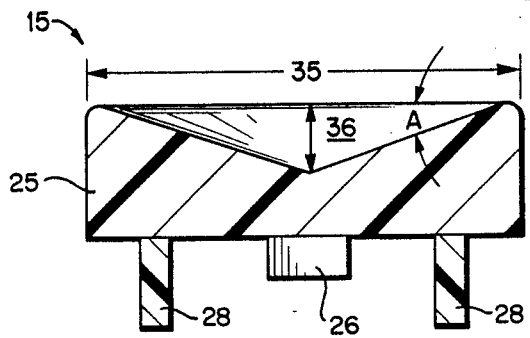
FIG. 3 is a vertical cross-sectional view of the cup of FIG. 2.

A pin 34 also is provided extending outwardly from each cup body 25, the pin having a predetermined thickness (vertical dimension), and extending from the body 25 in a direction generally perpendicular to the dimension 16. As illustrated in FIG. 3, there also is means defining a depression 36 in the top surface of the cup body 25. The dimension 35 of depression 36 typically may be about 3 ⅜ inches if apples or the like are the articles to be sorted. The depression depth 36 is just deep enough so that the article is positively held in place for property determination (e.g. weighing) and conveyance, but shallow enough so that the cup body 25 need be tilted only a small amount about an axis defined by rod 32 to effect discharge of the article with minimal bruising. For example as illustrated in FIG. 3, the depression 36 is generally conically shaped, with the sidewalls thereof making an angle A of between about 20°-30° with respect to the horizontal. This angle A will be optimized depending upon the article being conveyed, but for apples it is desirably only about 20° or slightly more.

The cup body 25 is connected to the chain 17 by the mechanisms 30, 32, 41, 47, and 53. The structure 41 comprises a plate 42 which has upturned ears 43 on one end thereof with means defining openings 44 in the ears 43, the openings 44 for receipt of the pivot rod 32. The structure 47 merely connects the rods 30, 32. In the embodiment illustrated, the structure 47 merely takes the form of a standard regular polyethylene chain link, having main elongated elements 48 interconnected by cross elements 49, and having means defining openings 50, 52 at the ends thereof for receipt of the rods 30, 32 respectively. The element 47 could take a wide variety of other shapes, the shape illustrated merely being one that is convenient and readily commercially available. The plate 42 is bolted or otherwise connected to the surfaces 53 extending outwardly from the chain 17 (see FIG. 2), the chain 17 itself comprising the links 54 which are interconnected by pins 55, as is conventional.

While the bosses 26 are preferably utilized in the weighing section to ride over the load cell, if desired pins, like pin 34, may be provided extending from both sides of the cup body 25, for weighing.

Figure 4:
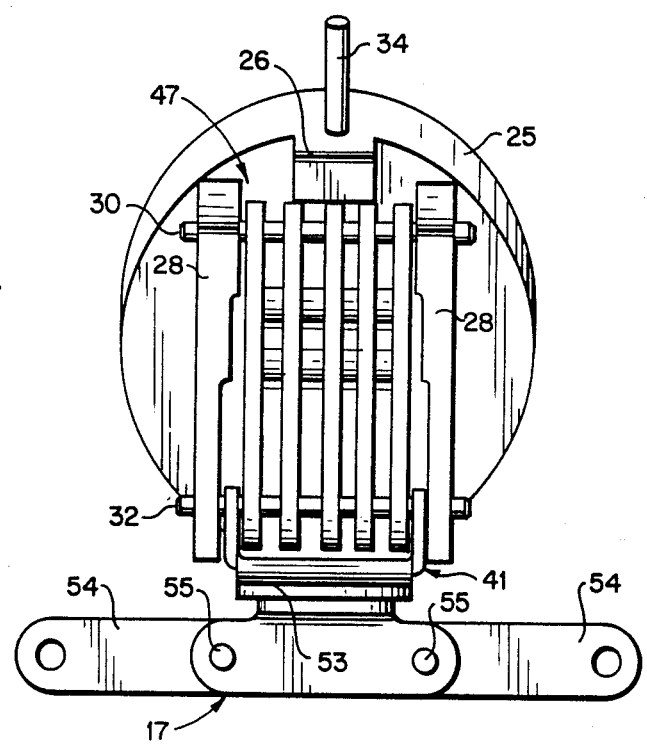
FIG. 4 is a side view of the cup of FIG. 2 shown pivoted about an axis connecting the cup to the chain.
Figure 5:
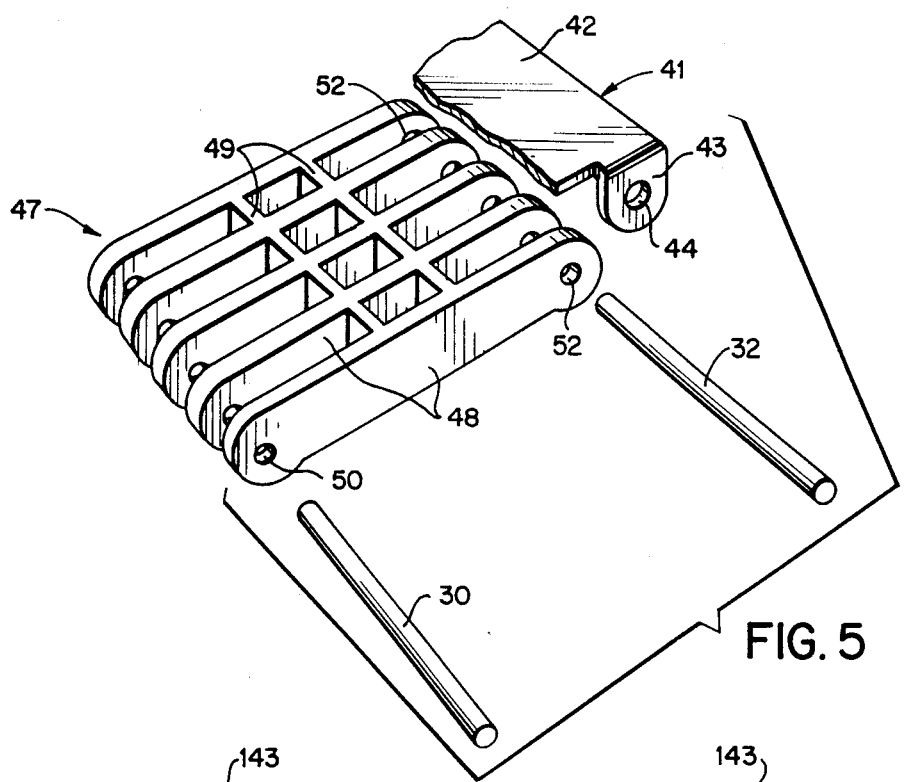
FIG. 5 is a exploded detail view of the mechanisms for interconnecting the cup and chain for the embodiment of FIG. 2.

As seen in FIG. 4, the cup body may be pivoted about an axis defined by the rod 32, the rod 32 extending generally parallel to the dimension 16. If the pin 34 is engaged and moved upwardly, the elements 28, 47 will pivot about the rod 32, while the ears 43 and plate 42 remain stationarily mounted to the chain 17 via surfaces 53.

Figure 6:
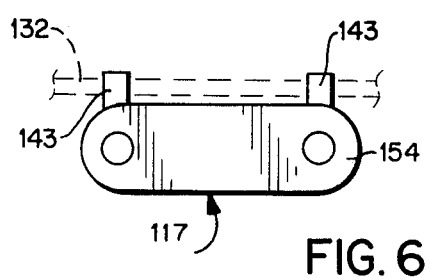
FIGS. 6 and 7 are side and end views respectively of a modified form of chain that the apparatus according to the invention can utilize.
Figure 7:
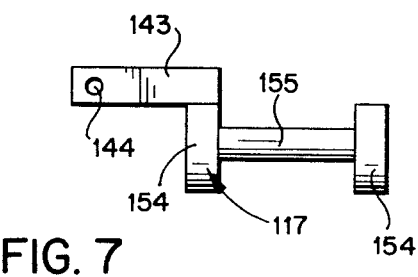

An alternative manner in which the chain can be connected to the cup is illustrated schematically in FIGS. 6 and 7. In this embodiment structures having the same function as in the FIGS. 2 through 4 embodiment are illustrated by the same reference numeral only preceded by a "1". In this embodiment, the chain 117 includes standard links with standard pivot pin connections 155 therebetween, with bars 143 welded to one of the links 154 of selected sections of the chain and extending outwardly therefrom in a dimension perpendicular to the dimension 16. The bars 143 have means defining openings 144 therein for receipt of the pivot rod 132.

Note that in both the embodiment of FIGS. 2 through 5, and the embodiment of FIGS. 6 and 7, the pivot surfaces for the cup are isolated from the articles being conveyed. This is particularly important where the articles are fruit, such as apples, to which a wax is typically applied during handling, insuring that there will be no wax buildup on the pivot surfaces which can ultimately can cause the pivotal action to be less responsive than desirable, and require cleaning (as in the cup constructions as illustrated in U.S. Pats. No. 4,660,665 and 4,262,807).

Figure 8:
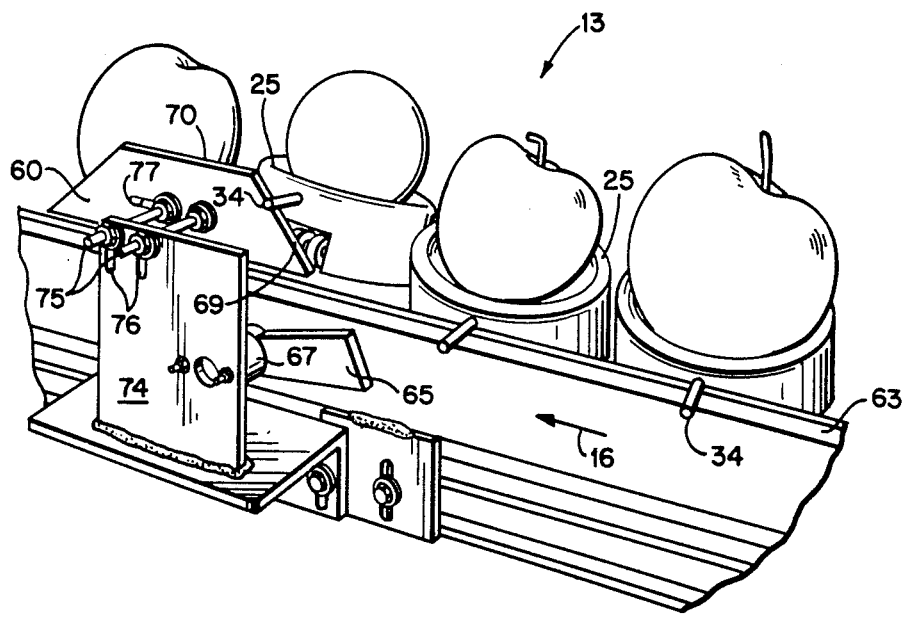
FIG. 8 is a perspective view of an exemplary discharge section of the apparatus according to the invention.
Figure 9:
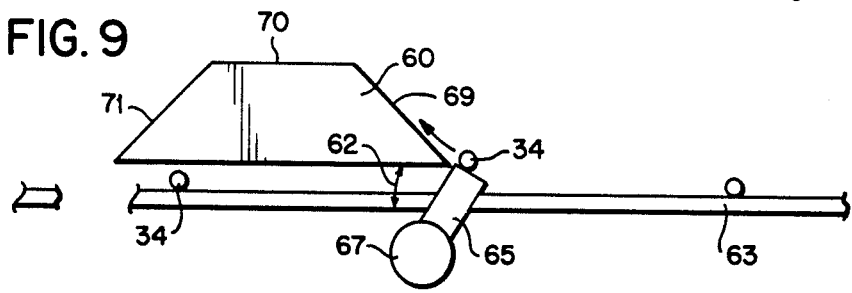
FIGS. 9 and 10 are side views of the exemplary discharge section of FIG. 8 illustrating deflection of a cup to ride up the stationary cam, or passage of the cup past the cam, respectively.
Figure 10:
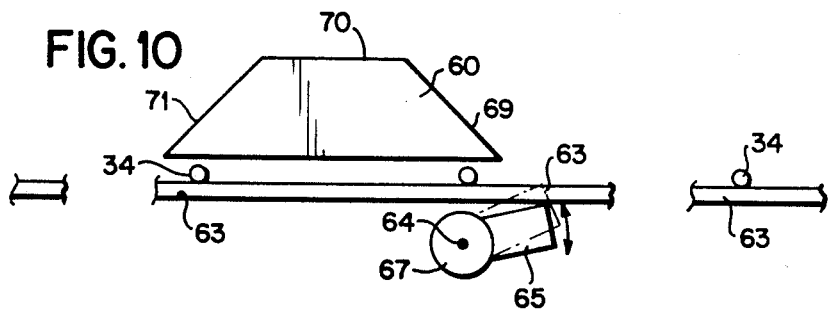

An exemplary discharge section 13 is illustrated in FIGS. 8 through 10. In this section, as in the weighing section 12, the chain 17 and article supporting elements 15 are continuous, so that there is no opportunity for bruising of the articles as they move from one section to the other. In the discharge section 13, the articles are discharged in a dimension which is generally perpendicular to the dimension of conveyance 16.

In the section 13 at a plurality of positions spaced therealong, stationary cams 60 are provided. The cams 60 cooperate with a rail 63, which the pins 34 ride upon. The cam 60 is spaced a vertical distance 62 (see FIG. 9) from the rail 63 which is slightly greater than the thickness (vertical dimension) of the pins 34 so that the pins 34 may either move underneath the cam 60, or be deflected onto the cam 60. Means are provided for selectively deflecting the pins 34 onto the cam 60, in the embodiment illustrated in FIGS. 8 through 10 such means taking the form of an arm 65 connected to a rotary solenoid 67. When the solenoid 67 is activated, it engages the pin 34 and causes the pin 34 to ride up it onto the upwardly angled surface 69 of the cam 60. By the time the pin 34 has reached the flat top surface 70 of the cam 60, the cup body 25 attached to the pin 34 has been pivoted a sufficient amount about the axis 32 so as to have effected discharge of the article (e.g. apple) therefrom. The pin 34, for the now empty cup, then rides back down the downwardly sloping surface 71 of the stationary cam 60 until it again engages the rail 63.

While the cam 60 is stationary, its position can be adjusted depending upon the articles being conveyed, etc. Adjustment may be provided by the mounting mechanisms 74, 75, and 76 illustrated in FIG. 8. Upstanding plate 74 is stationary with respect to the rail 63, and horizontally spaced therefrom, and mounts the rotary solenoid 67, as well as the bolts 75. Bolts 75 are received in vertically elongated openings 76 in the plate 74, and received in horizontally elongated openings 77 in the cam 70 (see FIG. 8) so that both the vertical and horizontal position of the upwardly inclined cam surface 69 may be adjusted.

FIG. 11 illustrates another embodiment of the deflecting means in the discharge section. In the FIG. 11 embodiment, structures having the same function as those illustrated in the FIGS. 8 through 10 embodiment are indicated by the same reference numeral only preceded by a "1". The only significant difference between this embodiment and the FIGS. 8 through 10 embodiment is that an electromagnet 165 is positioned close to the intersection between the rail 163 and an extension of the upwardly extending cam surface 169 of the stationary cam 160. As a pin 134 moves toward the electromagnet 165, if the weight or other property of the article carried by the cup associated with the pin 134 requires that it be discharged at the discharge area associated with the cam 160, the electromagnet 165 is energized, attracting the metal pin 134 toward it so that the pin 134 moves onto the surface 169, after which the current to the electromagnet 165 is cut off until the next cup with an article of desired property approaches it.

A common computer control is provided for the components of the apparatus 10. For example the rotary solenoid 67, the electric motor 80 for moving chain and cups, and the conventional load cell 81 in the weighing section 12, are all interconnected with the computer control 82. Depending upon the weights of the articles sensed in the weighing section 12, they will be discharged at the appropriate one of a plurality of discharge ports in the discharge section 13, and therefore the articles will be sorted by weight, or any other desired property sensed in the section 12.

Because the shallowness of the depression 36 and the fact that the cup body 25 is pivoted about the axis defined by rod 32 (which is parallel to the direction of conveyance 16), minimum bruising of the articles (e.g. apples) will occur in the discharge section 13.

FIG. 13 illustrates another embodiment. In this embodiment components comparable to those in the FIG. 12 embodiment are illustrated by the same reference numeral only preceded by a "1" or "2". In this embodiment, two, or even more, linearly connected groups of sections are provided. For example there is the first self-singulating section 111, the first weighing section 112, and the first discharge section 113. Then, immediately after the discharge section 113, and utilizing the same, continuously extending, cups and conveyor chain, a second self-singulating section 211 is provided, a second weighing section 212, and a second discharge section 213. A common motor 180 is provided for continuously conveying the chain and cups throughout all of the sections 111 through 113 and 211 through 213. A separate load cell 181, 281 is provided in each of the weighing sections, and each of the discharge sections has a plurality of solenoids 167, 267, or the like. A common computer control 182 is provided. In this way, the same elements may be utilized to weight size two (or more) feeds of fruit, which could be the same fruit in each case, or different fruits.

It will be seen that according to the present invention a simple, inexpensive, yet effective apparatus and method have been provided for effecting sorting of bruisable articles with a minimum amount of bruising. By providing self-singulation, shallow depressions in the article supporting elements 15, and discharge perpendicular to the direction of conveyance 16 (so that there is a minimum velocity component in any given direction at the time of discharge), fruit bruising is minimized. Also, the apparatus according to the invention has a number of other advantages compared to conventional weight sizers, such as shown in U.S. Pats. No. 4,660,665 and 4,262,807. In particular, the system can be run more quickly, at speeds up to about 10 cups per second due to the construction of the components and the closer placement of the article supporting elements 15. Also, since the pivot surfaces are isolated from any wax, or the like, that would be applied, less maintenance is necessary and better and more positive discharge can be expected.

While the invention has been shown in what is presently conceived to be the most practical and preferred embodiment, it will be apparent that many modifications may be made thereof. For example, while the invention has been shown with respect to a single line of cups 15, it is readily apparent that a plurality of lines of cups may be provided side-by-side. Each line may be provided with a separate feed section 18, or a common feed section may be provided. A wide variety of other modifications are also possible, and the invention is to be accorded the broadest interpretation of the appended claims so as to encompass all equivalent structures and methods.

What is claimed is:

1. An article sorter for sorting discrete bruisable articles, comprising:
    a continuous conveying chain elongated in a dimension of elongation;
    a plurality of discrete article supporting elements connected to said chain for linear movement therewith and pivotal movement with respect thereto;
    a plurality of stations for said continuous conveying chain and article supporting elements including: (a) a self-singulating section in which the articles are singulated onto the supporting elements, (b) an article property determining section through which the articles are carried by said supporting elements and properties thereof sensed, and (c) a discharge section in which the articles are selectively discharged at a plurality of spaced distinct locations depending upon the properties thereof sensed in said article property determining section; and
    wherein said section (a) comprises a feed conveyor disposed at an angle with respect to said dimension of elongation and on one side of said article supporting elements, and a cushioning backstop disposed on the opposite side of said supporting elements from said feed conveyor, and an overflow region for allowing articles not singulated onto said supporting elements to move off of said elements and said chain and to be ultimately returned to said feed conveyor.

2. A sorter as recited in claim 1, further comprising a second self-singulating section, a second article property determining section, and a second discharge section following said sections (a)–(c) with the same chain and supporting elements extending therethrough, and wherein said article property determining sections are weighing sections including means for determining the weights of the articles passing therethrough.

3. A sorter as recited in claim 1, wherein each article supporting element includes a pin having a predetermined thickness and extending outwardly therefrom generally perpendicular to said dimension of elongation; and wherein said discharge section (c) comprises a rail and a stationary cam having an upwardly angled cam surface located above said rail, said angled cam surface vertically spaced from said rail a distance slightly greater than the thickness of said pin so as to allow passage of said pin beneath said stationary cam if not deflected to said cam surface; and means for selectively deflecting said pins so as to engage said angled cam surface when deflected and thereby ride up said cam surface.

4. A sorter as recited in claim 1, further including means for simultaneously mounting said discrete article supporting elements for pivotal movement with respect to said chain about an axis generally parallel to said dimension of elongation, and for mounting said elements for lost motion in a vertical dimension so that when said elements are conveyed through section (b) each said element with supported article is distinctly separate from the other components thereof, said simultaneously mounting means comprising a single pin for each element operatively connected to said chain and mounting the element with which it is associated for pivotal movement and having a vertical lost motion reception by said element.

5. A sorter as recited in claim 1 comprising means for mounting said elements for pivotal movement with respect to said chain about an axis generally parallel to said dimension of elongation, and wherein each of said supporting elements comprises a plastic cup having means defining a shallow depression in a top face thereof, said depression being deep enough to positively hold an article for property determination and conveyance, but shallow enough so that the cup need be tilted only a small amount about said axis, so as to affect discharge with minimal bruising.

6. A sorter as recited in claim 5, wherein said means defining a depression provides a generally conically shaped depression with side walls making an angle of between about 20 and 30 degrees with respect to the horizontal.

7. A sorter as recited in claim 5, wherein said plastic cups are made of ultra high molecular weight polyethylene.

8. A sorter as recited in claim 1, wherein said section (b) comprises a weighing section, including a weighing means therein for weighing said articles while supported by said supporting elements.

9. A sorter as recited in claim 8 comprising means for mounting said elements for pivotal movement with respect to said chain about an axis generally parallel to said dimension of elongation, and wherein each of said supporting elements comprises a plastic cup having means defining a shallow depression in a top face thereof, said depression being deep enough to positively hold an article for property determination and conveyance, but shallow enough so that the cup need be tilted only a small amount about said axis, so as to affect discharge with minimal bruising.

10. A sorter as recited in claim 9, wherein said means defining a depression provides a generally conically shaped depression with side walls making an angle of between about 20 and 30 degrees with respect to the horizontal.

11. A sorter as recited in claim 9, wherein each article supporting element includes a pin having a predetermined thickness and extending outwardly therefrom generally perpendicular to said dimension of elongation; and wherein said discharge section (c) comprises a rail and a stationary cam having an upwardly angled cam surface located above said rail, said angled cam surface vertically spaced from said rail a distance slightly greater than the thickness of said pin so as to allow passage of said pin beneath said stationary cam if not deflected to said cam surface; and means for selectively deflecting said pins so as to engage said angled cam surface when deflected and thereby ride up said cam surface.

12. A method of handling bruisable articles to minimize the bruising action of handling utilizing a plurality of discrete article supporting elements which are mounted for pivotal movement about an axis generally parallel to the direction of conveyance, comprising the steps of:
 (a) while continuously conveying the bruisable articles in a direction of conveyance, sequentially (a1) singulating, (a2) weighing, and (a3) selectively discharging the articles depending upon the weights thereof, utilizing a continuous mechanism so that the articles are not transferred from one conveyance mechanism to another; and
 (b) practicing said step (a3) by discharging the articles so that there is a minimal velocity component in the direction of conveyance when the article is discharged, by causing selective discrete article supporting elements to move into engagement with a stationary cam so as to pivot them about said axis to be discharged in a direction generally perpendicular to the direction of conveyance.

13. A method as recited in claim 12, utilizing a plurality of discrete article supporting elements mounted for linear movement in said direction of conveyance in single file relationship, with an overflow discharge disposed in an area prior to weighing of the articles, and wherein step (a1) is practiced by feeding the articles to the supporting elements in a dimension generally perpendicular to said direction of conveyance while providing a cushioning backstop for the articles to engage to stop their movement in the feed direction, and causing the overflowing articles not received by a discrete article supporting element to move off said elements prior to the practice of step (a2).

14. A method as recited in claim 12, wherein said bruisable articles are pieces of fruit.

15. An article sorter for sorting discrete bruisable articles comprising:
 a continuous conveying chain elongated in a dimension of elongation;
 a plurality of discrete article supporting elements connected to said chain for linear movement therewith, and including means for mounting said elements for pivotal movement with respect to said chain about an axis generally parallel to said dimension of elongation, each of said supporting elements comprising a plastic cup having means defining a shallow depression on a top face thereof, said depression being deep enough to positively hold an article for property determination and conveyance, but shallow enough so that the cup need be tilted only a small amount about said axis to effect discharge of the article;
 means for selectively effecting tilting of said cups so as to effect discharge of the articles therefrom, said means comprising stationary cam means and deflecting means for bringing said cups into operative association with said cam means;
 wherein said means for mounting a cup for pivotal movement about said axis further comprises means for allowing lost motion movement of said cup with respect to said chain in the vertical so as to allow weighing of the article being conveyed by said cup during continuous conveyance; and
 wherein said means for effecting pivotal movement of said cup further comprises a stationary rail elongated in the dimension of elongation, and a pin extending from each cup and engaging said rail;

said stationary cam mounted adjacent said rail but vertically spaced therefrom a distance to allow the passage of a pin between said cam and said rail, and said deflecting means comprising means for selectively deflecting said pins onto said stationary cam.

16. An article sorter for sorting discrete bruisable articles, comprising:
  a continuous conveying chain elongated in a dimension of elongation;
  weighing means for weighing the articles when conveyed over said weighing means by said chain;
  a plurality of discrete article supporting elements connected to said chain for linear movement therewith, and including means for simultaneously mounting said elements for pivotal movement with respect to said chain about an axis generally parallel to said dimension of elongation, and for mounting said elements for lost motion in a vertical dimension so that when said elements are conveyed over said weighing means and each said element with supported article is distinctly separated from the other components of said sorter so that the supported article is accurately weighed by said weighing means;
  said simultaneous mounting means comprising a single pin for each element operatively connected to said chain and mounting the element with which it is associated for pivotal movement and having a vertical lost motion reception by said element; and
  means for selectively effecting tilting of said elements about said axis so as to effect discharge of the articles therefrom.

17. An article sorter for sorting discrete bruisable articles, comprising:
  a continuous conveying chain elongated in a dimension of elongation;
  a plurality of discrete article supporting elements connected to said chain for linear movement therewith and pivotal movement with respect thereto;
  a plurality of stations for said continuous conveying chain and article supporting elements including: (a) a self-singulating section in which the articles are singulated onto the supporting elements, (b) an article property determining section through which the articles are carried by said supporting elements and properties thereof sensed, and (c) a discharge section in which the articles are selectively discharged at a plurality of spaced distinct locations depending upon the properties thereof sensed in said article property determining section; and
  means for simultaneously mounting said discrete article supporting elements for pivotal movement with respect to said chain about an axis generally parallel to said dimension of elongation, and for mounting said elements for lost motion in a vertical dimension so that when said elements are conveyed through section (b) each said element with supported article is distinctly separate from the other components thereof, said simultaneously mounting means comprising a single pin for each element operatively connected to said chain and mounting the element with which it is associated for pivotal movement and having a vertical lost motion reception by said element.

18. A sorter as recited in claim 17, wherein said section (a) comprises a feed conveyor disposed at an angle with respect to said dimension of elongation and on one side of said article supporting elements, and a cushioning backstop disposed on the opposite side of said supporting elements from said feed conveyor, and an overflow region for allowing articles not singulated onto said supporting elements to move off of said elements and said chain and to be ultimately returned to said feed conveyor.

19. An article sorter for sorting discrete bruisable articles, comprising:
  a continuous conveying chain elongated in a dimension of elongation;
  a plurality of discrete article supporting elements connected to said chain for linear movement therewith and pivotal movement with respect thereto;
  a plurality of stations for said continuous conveying chain and article supporting elements including: (a) a self-singulating section in which the articles are singulated onto the supporting elements, (b) an article property determining section through which the articles are carried by said supporting elements and properties thereof sensed, and (c) a discharge section in which the articles are selectively discharged at a plurality of spaced distinct locations depending upon the properties thereof sensed in said article property determining section; and
  a second self-singulating section, a second article property determining section, and a second discharge section following said sections (a)-(c) with the same chain and supporting elements extending therethrough, and wherein said article property determining sections are weighing sections including means for determining the weights of the articles passing therethrough.

20. An article sorter for sorting discrete bruisable articles, comprising:
  a continuous conveying chain elongated in a dimension of elongation;
  a plurality of discrete article supporting elements connected to said chain for linear movement therewith and pivotal movement with respect thereto;
  a plurality of stations for said continuous conveying chain and article supporting elements including: (a) a self-singulating section in which the articles are singulated onto the supporting elements, (b) an article property determining section through which the articles are carried by said supporting elements and properties thereof sensed, and (c) a discharge section in which the articles are selectively discharged at a plurality of spaced distinct locations depending upon the properties thereof sensed in said article property determining section;
  each article supporting element including a pin having a predetermined thickness and extending outwardly therefrom generally perpendicular to said dimension of elongation; and
  said discharge section (c) comprising a rail and a stationary cam having an upwardly angled cam surface located above said rail, said angled cam surface vertically spaced from said rail a distance slightly greater than the thickness of said pin so as to allow passage of said pin beneath said stationary cam if not deflected to said cam surface; and means for selectively deflecting said pins so as to engage said angled cam surface when deflected and thereby ride up said cam surface.

21. A sorter as recited in claim 20, wherein said means for selectively deflecting said pins comprises an electromagnet associated with each stationary cam.

22. A method of handling bruisable articles to minimize the bruising action of handling utilizing a plurality of discrete article supporting elements mounted for linear movement in said direction of conveyance in single file relationship, with an overflow discharge disposed in an area prior to weighing of the articles, comprising the steps of:
(a) while continuously conveying the bruisable articles in a direction of conveyance, sequentially (a1) singulating, by feeding the articles to the supporting elements in a dimension generally perpendicular to said direction of conveyance while providing a cushioning backstop for the articles to engage to stop their movement in the feed direction, and causing the overflowing articles not received by a discrete article supporting element to move off said elements prior to the practice of step (a2), (a2) weighing, and (a3) selectively discharging the articles depending upon the weights thereof, utilizing a continuous mechanism so that the articles are not transferred from one conveyance mechanism to another; and
(b) practicing said step (a3) by discharging the articles so that there is a minimal velocity component in the direction of conveyance when the article is discharged.

* * * * *